2,900,236

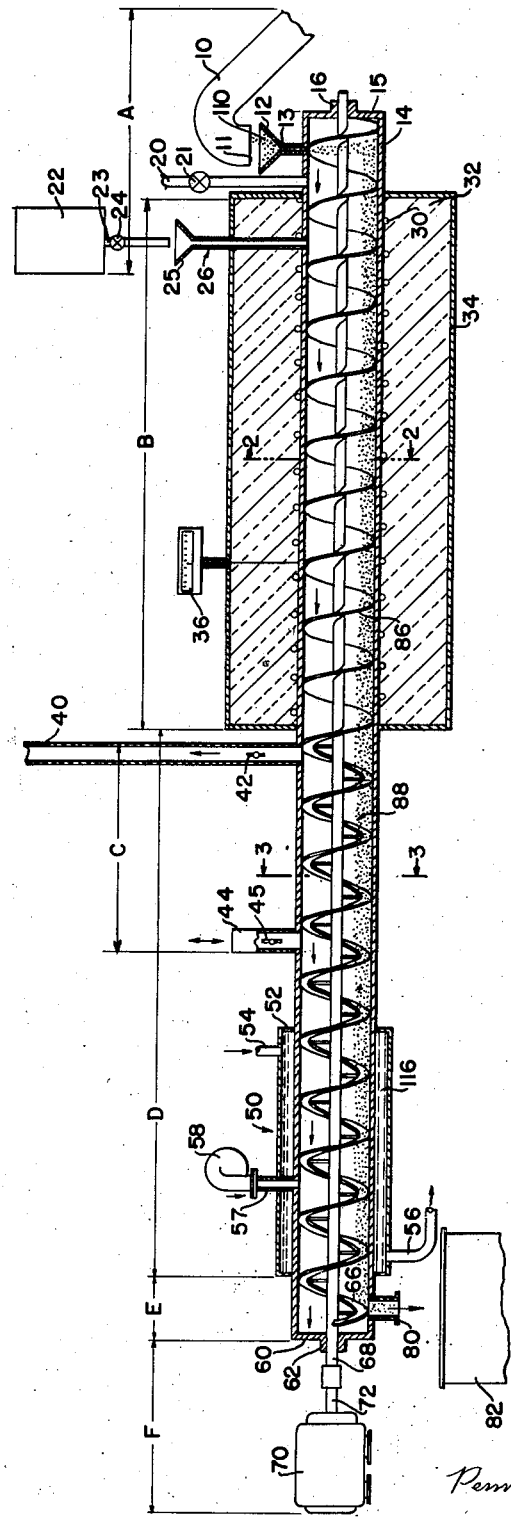
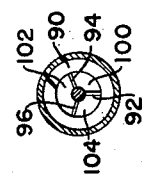
Aug. 18, 1959  W. C. SPEED ET AL  2,900,236
PRODUCTION OF FERROMAGNETIC IRON OXIDE
Filed Aug. 3, 1955
FIG. 1
FIG. 2
FIG. 3
INVENTORS
WILLIAM C. SPEED
GEORGE M. SUTHEIM
BY
ATTORNEYS

United States Patent Office 2,900,236
Patented Aug. 18, 1959

PRODUCTION OF FERROMAGNETIC IRON OXIDE

William C. Speed, Pound Ridge, N.Y., and George Martin Sutheim, Stamford, Conn., assignors to Audio Devices, Inc., New York, N.Y., a corporation of New York Application August 3, 1955, Serial No. 526,269

6 Claims. (Cl. 23—200)

This invention relates to the production of ferromagnetic iron oxide and has for its object more particularly the production of gamma ferric oxide which is highly ferro-magnetic.

Most ferric oxides, natural or synthetic, are nonmagnetic, but it is well known that such oxides, referred to commonly as alpha ferric oxides, can be transformed in a relatively simple manner into ferrosoferric oxide and then into gamma ferric oxide. The process consists of a reduction operation executed at elevated temperature, which transforms yellow (the monohydrate form) or red (the anhydride form) alpha ferric oxide, alpha $Fe_2O_3$, into black ferrosoferric oxide, $Fe_3O_4$, often called magnetite. The hot $Fe_3O_4$ is carefully cooled and is then re-heated at a lower temperature and subjected to a carefully controlled oxidation operation which transforms the black $Fe_3O_4$ into a yellowish brown gamma ferric oxide, gamma $Fe_2O_3$.

This two-step operation is performed on an industrial scale for a variety of purposes, e.g. magnetic ore separation, or preparation of magnetic core material for magnetic memory systems. The literature in journals and patents describes the reduction process to be executed by heating the non-magnetic alpha ferric oxide in the form of pellets or powders to a temperature of approximately 1000° F. in rich reducing atmospheres, such as hydrogen, carbon monoxide, city gas, dissociated ammonia, sulfur, etc. The use of hydrogen is very dangerous because of its explosive nature; and the other reducing agents are also dangerous because of their poisonous or noxious nature. The resultant product is cooled in an inert or reducing atmosphere to room temperature. This latter step generally is lengthy but is necessary because the black ferrosoferric oxide formed is strongly pyrophoric at elevated temperature, e.g. above 340° F., whereby its magnetic properties are seriously damaged. Therefore, the hot black ferrosoferric oxide must be carefully protected from any contact with air, and numerous precautions are suggested to prevent such contact, for instance, by cooling the oxide in the reduction furnace in the same rdeucing gas, quenching the hot material in water or other liquids, using Dry Ice for the cooling, using steam as a protecting atmosphere, etc. Even lengthy periods of cooling or quenching in water to prevent ignition of the magnetic black oxide are not adequate. The ferrosoferric oxide is very unstable immediately after reduction and, even though cooled, it often reoxidizes so rapidly in the presence of air as to reconvert the black oxide to its former alpha ferric oxide form. All of these precautions increase the costs of the operation without giving absolute guaranty for safe operation.

The second step of oxidizing the black ferrosoferric oxide to yellowish-brown gamma ferric oxide is performed by re-heating it cautiously in an oxygen containing atmosphere. Due to the pyrophoric properties of the ferrosoferric oxide this operation is also difficult to control. If the temperature is too low, the transformation does not take place. If it is higher than necessary, the exothermic nature of the process leads to a spontaneous overheating which is deleterious to the material. Therefore another set of precautions must be taken, either to work at as low a temperature as possible and take care of dissipating the exothermic heat effectively or to permit at any time only a limited amount of oxygen to get in touch with the heated ferrosoferric oxide to prevent rapid (exothermic) oxidation.

As a result of our investigations we have discovered that disadvantages of the kind enumerated can be overcome for the most part. Thus, we have found that the two-separate-steps operation can be modified into a continuous process conducted in a closed system. The equipment, which will be described in more detail below, permits the continuous feeding of raw material, reducing it in a hot zone, passing it without interruption into a somewhat cooler zone in which a counter stream of air is introduced: this immediately transforms the black $Fe_3O_4$ into the finished gamma $Fe_2O_3$ which is removed continuously. A number of advantages are achieved by processing the iron oxide in a continuous operation, namely:

(1) The necessity of cooling or quenching the black ferrosoferric oxide after heating is eliminated; there is no loss of batches of the oxide and fire hazard due to spontaneous combustion of the black oxide cannot occur because the black oxide never leaves the closed system;

(2) Re-heating of the black ferrosoferric oxide—previously cooled—is unnecessary, because in our system the black oxide is processed when still hot from the foregoing reduction;

(3) No special precautions are necessary, except to provide a careful dosage of the counter current air during the oxidation process; because the hot black ferrosoferric oxide, as it leaves the reduction zone, carries its own protection in the form of the reducing atmosphere. As the black oxide travels into the oxidation zone it gradually cools, loses the protecting reducing atmosphere which is in turn replaced by the countercurrent of oxidizing air. By that time the latter has already lost much of its oxygen, because it was absorbed earlier while passing over the partly oxidized material. The heat created by the exothermic oxidation reaction is therefore slowly released and cannot cause damage by overheating the product.

(4) Stability is imparted to the final product, at the end of the oxidation step, without damage to its magnetic properties.

(5) The total time in which the operation is performed is considerably reduced since our continuous process may be said to take about as much time as each of the two separate steps.

The apparatus employed for the purpose may take one of several forms but the method is substantially the same.

The non-magnetic alpha ferric oxide is fed into an enclosed conveyor system at a predetermined rate of feed. The conveyor may be a flat belt passing through a vapor restricting heating section, or a slightly inclined rotating tube, or a stationary tube with internal screw conveyor, or a round or flat vibratory conveyor.

In all cases, the conveyor may be considered as being divided into two operating zones, reducing and oxidizing. The first is a hot-reducing zone, heated in any suitable manner, such as electrically, by gas, or oil, which is accurately controlled between 1000° F. and 1200° F. for optimum results. The second is a cooling-oxidizing zone which, for example, may be water-jacketed or water-sprayed. If it is sufficiently long, it may be finned and air cooled. The two zones are advantageously of about the same length. Diameters, widths, heights, etc.—may be considerably varied depending on space allowable, through-put required, fineness of particle size of the ferric oxide and degree of reduction required.

Feeding of the raw material into the hot reducing zone should be regular and uniform and may be accomplished in any of innumerable well known ways. Feed advantageously occurs through an opening very slightly greater than actually required in order to confine and economize on the reducing gas, but to allow the escape of water vapor which accompanies the reaction.

The reducing agent may be mixed in with the raw iron oxide before feeding, or at the time of feeding, or after entering the hot reducing zone.

We have used numerous reducing agents and find that almost anything which has a high affinity for oxygen and cracks or decmposes at a reasonable temperature, that is, does not evaporate too quickly or fails to crack at the reaction temperature will work—for example, wax, starch, kerosene, light fuel oil, ordinary low grade lubricating oil, varnolene, etc. Actually we find almost any organic matter with low ash and tar content which cracks below 1000° F. does well, and we use #3 fuel oil or cheap motor oil with great success. We prefer to mix the oil directly into the alpha ferric oxide, in the proportions of about 3 to 5% by weight, depending of course on the reducing agent or agents employed, in order to have the active reducing gases permeate the oxide.

The heat of the reducing zone should be very uniform because under- or over-heating even in small degree is deleterious to the magnetic properties of the iron oxide. Either very thin layers or good mixing of the material is indispensable to assure even heat treatment. With very fine powders, we find reduction takes place almost instantly. With larger particles or aggregates the required penetration time is substantially increased. Through-put rate and dwell or detention time are adjusted to give maximum yield with maximum magnetic properties.

At the intermediate portion between the heating and the cooling zones, we have a dampered tube which performs a dual function. First, it allows the escape of water vapor, spent gases and excess reducing gases; and, second, it acts to draw fresh air through the cooling zone in a counter flow direction.

The iron oxide at this mid point is deep black, magnetic and pyrophoric and at a temperature of about 1100° F. Obviously up to this time re-oxidation or ignition is impossible, because the material is in an oxygen-free reducng atmosphere. Even the temperature is far above that required for oxidation.

We now find that as the black ferrosoferric oxide passes into the cooling zone it meets with a small amount of oxygen depleted air. That is the air is very lean in oxygen and very rich in inert nitrogen. Oxidation begins immediately but at a gentle rate and the reaction is only slightly exothermic. As the iron oxide proceeds through the cooling zone the oxygen content of the atmosphere becomes progressively richer, the oxidation reaction more rapid, and the cooling action more positive.

By balancing the incoming fresh air from the gamma ferric oxide outlet end of the cooling zone, we allow the now almost cool iron oxide to meet completely fresh air; but, since the oxidizing reaction is almost complete, the danger of violent exothermic reaction is passed and the resulting gamma ferric oxide may be allowed to pass out of the kiln into fresh air without further precaution. The material may still be too hot to touch and of a dirty brown color but as soon as cooling is complete the oxide will assume a clean clear yellowish-brown color, of strong magnetic properties and completely stable.

We have built and operated three of these units, one of a rotating tube type, one of a flat traveling belt type, and one of a stationary tube type with a screw conveyor inside. The last and latest seems to be the most satisfactory.

These and other features of the inventions will be better understood by referring to the attached drawing, taken in conjunction with the following description, in which Fig. 1 is a longitudinal view, mostly in cross-section, of an apparatus illustrative of a practice of the invention;

Fig. 2 is a section on the line 2—2 of Fig. 1; and

Fig. 3 is a section on the line 3—3 of Fig. 1.

Referring to Fig. 1 and looking from right to left, the apparatus shown is divided generally into a feeding or charging zone A, a heating-reducing zone B, a gas venting zone C, a cooling-oxidating zone D, a discharging zone E, and a power-driving zone F. As shown some, if not all, of the zones may overlap to some extent.

Feeding or charging zone A includes an inclined enclosed endless conveyor 10 with its discharge opening 11 extending over a funnel 12 with a fairly small outlet 13 communicating with the end portion of a generally horizontal conveyor tube 14 sealed at its end with a plate 15 provided with a shaft bearing 16. Outlet 13 is sufficiently small to inhibit ingress of objectionable amounts of air with the alpha ferric oxide going into the conveyor tube for treatment.

As indicated above, various reducing agents may be employed. They may be gaseous, liquid, or solid, or a combination of two or more of them. In case a gaseous reducing agent is to be used, one preferably non-dangerous, it can be introduced through an inlet 20, having a valve 21, to the interior of the conveyor tube. In case a liquid reducing agent is to be used, it can be stored in a tank 22, from which depends a conduit 23, having a valve 24, over a funnel 25 connecting with a conduit 26 communicating with the interior of the conveyor tube. The passageway of the conduit is sufficiently small in cross-section to remain filled with the liquid reducing agent and thus to keep outside air from seeping into the tube. In case a solid reducing agent is to be used, a similar arrangement may be employed. Liquid and solid reducing agents may of course be fed to the tube with the iron oxide.

Heating-reducing zone B includes electrical resistance means 30 wound spirally around the exterior of the conveyor tube, and connected to a source of electrical energy, now shown. That portion of the tube is provided with a thick covering of heat-insulating material 32, the same being surrounded by a metal casing 34 for protection and to help keep it in place. A pyrometer 36 is secured to the top of the casing and makes thermal contact with the conveyor tube. In this way suitable temperature control inside the tube may be provided.

Some latitude is possible with the gas venting zone C. It is located advantageously intermediate the heating-reducing and the cooling-oxidizing zones. As shown it includes a stack 40 just rearwardly of the reducing-heating zone B. The stack is provided with a damper 42. The stack preferably communicates with the outside atmosphere so that excess reducing gases and other gaseous products of reduction may be vented to the outside where they will not annoy operators of the apparatus. Spaced a suitable distance from the stack is a combination inlet-outlet tube 44 which may communicate with the inside atmosphere. It is provided with a damper 45. The stack may be said to rise from the far end portion of the heating-reducing zone while the tube rises from or near the far end portion of the cooling-oxidizing zone.

Cooling-oxidizing zone D includes water-cooling means 50, which advantageously is in the form of a water-jacket 52 around the conveyor tube with a water inlet 54 at one end and a water outlet 56 at the other end.

Oxidizing air may be supplied to the cooling-oxidizing zone in any suitable manner. It is advantageous to feed the air in regulated amounts. In the construction shown an air-inlet 57 at the far end of the cooling oxidizing zone communicates at one end with the interior of the conveyor tube and at the other end with a fan 58 so that supplemental outside air may be driven into the tube, as desired.

The far end of the conveyor tube terminates in an end plate 60 provided with a shaft bearing 62. The tube is fitted with a spiral conveyor 66 secured to a longitudinal shaft 68, one end of which fits in bearing 16 of end plate 15 and the other end of which fits in bearing 62 of end plate 60.

Power-driving zone F includes a motor 70, coupled with a speed reducer, having a drive shaft 72 coupled to shaft 66 in the conveyor tube.

The far or discharge end of the tube is provided with a depending outlet 80, so that treated iron oxide may be discharged into a removable container 82. That tube outlet may be employed also as an inlet for air, or some air, into the tube. For that reason the outlet is preferably no larger than that about necessary to discharge the treated iron oxide.

The screw conveyor is advantageously divided into two main parts structurally. The first part or half 86, which extends through the heating-reducing zone, as shown in Fig. 2, is of conventional design; that is, the spiral portion is continuously solid or imperforate from the shaft to the tube. This helps to confine the iron oxide and the reducing agent between convolutions of the spiral, thereby assuring thorough mixing of the two when the reducing agent is non-volatilized as well as when it is volatilized. The reducing agent is thus made to mix with the iron oxide while it passes concurrently with the iron oxide toward the cooling-oxidizing zone. By the time the alpha ferric oxide passes through its treatment stage it is thoroughly heated and reduced to ferrosoferric oxide.

The second part or half 88 of the screw conveyor, as shown in Fig. 3, is discontinuous or perforate. To this end the screw conveyor blade or rim 90 is mounted on a plurality of relatively small spokes 92, 94, 96, equidistantly spaced spirally and circumferentially of the screw; thus simulating a spider effect. This structure causes some of the ferrosoferric oxide to advance through spaces 100, 102, 104 inwardly of the spiral blade. The spiral blade as well as the spokes cause the ferrosoferric oxide to become intimately intermixed or churned with air advancing countercurrently through the cooling conveyor tube.

The apparatus may be employed as follows in a practice of the invention. With the use of endless conveyor 10, a body of alpha ferric oxide 110 of suitable particle size is loaded at a predetermined rate into funnel 12, from which it drops by gravity gradually through outlet 13 into the interior of screw conveyor tube 14. Motor 70 is set into operation, the rotation of its drive shaft 72 being in a direction to cause the ferric oxide to advance in the tube from right to left, as one views Fig. 1. Due to the constricted size of outlet 13, substantially no outside air is admitted to the tube, thus preventing the creation of oxidizing conditions in the heating-reducing zone by virtue of such air. The tube gradually fills up to its normal work level throughout its entire length. Heating means 30 are employed to heat the ferric oxide indirectly, the amount of heat supplied being regulated in accordance with the temperature indications of pyrometer 36.

As already indicated, each spiral convolution of the spiral conveyor in the heating-reducing zone tends to retain its body of the ferric oxide in contact with the reducing agent.

Due to the increase in temperature the reducing agent is cracked or decomposed gradually and is intimately intermixed with the alpha ferric oxide particles. The net result is to subject the oxide particles to reduction as they advance through the heating-reducing zone, to form ferrosoferric oxide.

As the spent and unspent gaseous reducing agent and other gaseous products resulting from the reduction operation reach the entrance to stack 40, they rise therethrough and escape to the outside atmosphere. Damper 42 may be regulated so that the exiting gases are under pressure higher than atmospheric, thus preventing ingress of outside air downwardly through the stack into the screw conveyor tube.

Water 116 is passed through inlet 54 into water jacket 52 and escapes through outlet 56 to cool the tube and its contents in the cooling-oxidizing zone. As indicated above, it is desirable to have regulated amounts of air rise through outlet 80 into the far end of the tube, supplemental air being passed into the tube by means of fan 58 through air-inlet 57. It will thus be seen that as the highly heated ferrosoferric oxide leaves the heating-reducing zone it is met with a countercurrent of preheated air in the cooling-oxidizing zone.

As the air advances through the conveyor tube, from left to right as one views Fig. 1, it gradually oxidizes the ferrosoferric oxide to form the desired gamma ferric oxide. Due to the design of the screw conveyor in the cooling-oxidizing zone, the air is intimately admixed with the ferrosoferric oxide. As the air first enters the zone it is relatively rich in oxygen; but the air becomes leaner in oxygen and relatively richer in inert nitrogen as it advances toward the heating-reducing zone; so that it is this oxygen-lean nitrogen-rich air that first comes into contact with the heated ferrosoferric oxide.

While, as indicated above, all of the air may be vented through stack 40, it is sometimes desirable to pass at least some of the air through tube 44 before it reaches stack 40. Damper 45 in tube 44 may be adjusted so that the air, water vapor and other gaseous oxidizing products are under positive pressure higher than atmospheric as they are vented, thus preventing ingress of air downwardly through the stack into the conveyor tube. Since tube 44 is spaced from stack 40, it reduces the opportunity for even the oxygen-lean air to come in contact with the heated ferrosoferric oxide entering the cooling-oxidizing zone. On the other hand, it may be desirable sometimes to let some air pass downwardly through tube 44 to conveyor tube 14 to supplement that coming from air-inlet 57.

By the time the ferrosoferric oxide advances through the entire length of the cooling-oxidizing zone it is substantially completely converted to the highly desired gamma ferric oxide. This oxide drops by gravity through outlet 80 into container 82 without any danger of catching fire.

The relatively large free gas space provided in each of the heating-reducing and cooling-oxidizing zones adjacent the ferric oxide therein facilitates contact between the individual ferric oxide particles and the reducing and oxidizing gases, respectively, and facilitates venting of the spent reducing and oxidizing gases from both the heating-reducing and cooling-oxidizing zones.

The present apparatus includes a 20 foot thin wall steel tube about 10 inches in diameter with a 1 inch iron oxide inlet and a 2 inch iron oxide outlet. The hot zone, about 9 feet long, is electrically heated and requires a maximum power of about 13 kw.; and its temperature is regulated by a thermocouple thermostat. Insulation consists of a layer of asbestos wool about 16 inches thick. In order to get good mixing, the screw rotates about 2 to 3 times per minute and has a pitch of about 12 inches. The vapor exhaust stack is a 2 inch pipe with butterfly valve and is located just after the hot zone and is approximately in the top of the middle of the tube. Water cooling is supplied only on the last half of the cooling-oxidizing zone. An extra air inlet is provided just before or in the water-cooling zone; and a small fan with damper may supply extra air under slight pressure, if the reducing gases tend to encroach on the cooling-oxidizing zone and are not completely carried away by the exhaust stack. The reducing materials we prefer are light fuel oil or low grade engine oil which we mix in with the alpha ferric oxide at the time of screening before feeding to the conveyor tube. However, oil may be dripped onto the iron oxide in the feed funnel.

In actual practice the converter is started by making black ferrosoferric oxide. This is done by closing all the dampers. Temperature is adjusted to give optimum magnetic properties. Feed and speed are adjusted to give uniform conversion and maximum through-put. When these constants are established, we then open the air stack dampers and if necessary start the small fan. Within about ten minutes the black oxide turns from black to brown; if too dark we increase the air; if reddish, the forced draft is decreased. Visual color is the only necessary guide at this point. A light clear yellow brown indicates that oxidation is complete. Redness or red particles or particles containing red cores indicate the material has burned and is now admixed with non-magnetic alpha ferric oxide.

This unit manufactures gamma ferric oxide at the minimum rate of about 50 lbs. an hour and a maximum of about 70 lbs.

It will be clear to those skilled in the art that the above is by way of example, and that the practice of the invention readily lends itself to a number of useful modifications.

Reference may be made to our copending application Serial No. 526,270 filed simultaneously with the present application for claims directed to the apparatus herein disclosed.

We claim:

1. In the method of converting non-magnetic alpha ferric oxide into magnetic gamma ferric oxide, wherein a confined body of the alpha ferric oxide is successively and continuously passed through a heating-reducing zone to convert it to magnetic ferrosoferric oxide and then through a cooling-oxidizing zone to convert the ferrosoferric oxide into magnetic gamma ferric oxide, regulated amounts of a reducing agent being introduced into the heating-reducing zone, regulated amounts of oxidizing air being introduced into the cooling-oxidizing zone, and cooled gamma ferric oxide is discharged from the cooling-oxidizing zone, the improvement in which the heating-reducing and the cooling-oxidizing zones are generally horizontally disposed and in direct communication with one another, the ferric oxide is caused to pass continuously in the same direction and in a relatively thin body through the communicating heating-reducing and the cooling-oxidizing zones, the reducing agent is introduced into the charging end of the heating-reducing zone and passes concurrently with the relatively thin body of ferric oxide through said zone, and in contact therewith, the oxidizing air is introduced into the discharging end of the cooling-oxidizing zone and passes countercurrently to the relatively thin body of ferric oxide moving through said zone and in contact therewith, a relatively large free gas space is provided in each of said zones adjacent the ferric oxide therein to facilitate contact between the individual ferric oxide particles and the reducing and oxidizing gases, respectively, and to facilitate venting of the spent reducing and oxidizing gases from the heating-reducing and cooling-oxidizing zones, the spent gases from the heating-reducing zone are vented from adjacent the end of that zone directly to the open atmosphere to prevent their entry into the cooling-oxidizing zone and their further contact with the oxide, and the spent gases from the cooling-oxidizing zone are vented from adjacent the end of that zone directly to the atmosphere to prevent their entry into the heating-reducing zone and their further contact with the oxide.

2. Method according to claim 1, in which the spent gases from the heating-reducing zone and the spent gases from the cooling-oxidizing zone are intermingled and vented simultaneously from a point generally intermediate the two zones to the open atmosphere.

3. Method according to claim 1, in which at least a portion of the air passed into the cooling-oxidizing zone is under positive pressure higher than atmospheric.

4. Method according to claim 1, in which the iron oxide is mixed with the reducing and oxidizing agents as it passes through the two zones to facilitate the reducing and oxidizing reactions.

5. Method according to claim 1, in which the reducing agent is in the form of oil, and the oil is admixed with the alpha ferric oxide before it reaches the heating-reducing zone.

6. Method according to claim 1, in which the gases in the heating-reducing and the cooling-oxidizing zones are at a pressure higher than atmospheric to prevent ingress of unwanted outside air into the zones.

References Cited in the file of this patent

UNITED STATES PATENTS

| 672,192 | MacDonald | Apr. 16, 1901 |
| 2,545,932 | Tiddy et al. | Mar. 20, 1951 |
| 2,689,167 | Dovey et al. | Sept. 14, 1954 |
| 2,689,168 | Dovey et al. | Sept. 14, 1954 |
| 2,693,409 | Stephens | Nov. 2, 1954 |
| 2,694,656 | Camras | Nov. 16, 1954 |

FOREIGN PATENTS

| 520,690 | Great Britain | May 1, 1940 |
| 148,978 | Australia | Nov. 12, 1952 |

OTHER REFERENCES

Abraham et al.: "Nature," No. 2902, vol. 115, page 930, June 13, 1925.

UNITED STATES PATENT OFFICE
CERTIFICATE OF CORRECTION

Patent No. 2,900,236                                                 August 18, 1959

William C. Speed et al.

It is hereby certified that error appears in the printed specification of the above numbered patent requiring correction and that the said Letters Patent should read as corrected below.

Column 1, line 55, for "rdeucing" read -- reducing --; column 4, line 43, for "now" read -- not --.

Signed and sealed this 1st day of March 1960.

(SEAL)
Attest:

KARL H. AXLINE                                                ROBERT C. WATSON
Attesting Officer                                            Commissioner of Patents